US012700420B2

(12) United States Patent
Jin et al.

(10) Patent No.: US 12,700,420 B2
(45) Date of Patent: Aug. 4, 2026

(54) ELECTRONIC APPARATUS, CONTROL METHOD THEREOF AND ELECTRONIC SYSTEM

(71) Applicant: SAMSUNG ELECTRONICS CO., LTD., Suwon-si (KR)

(72) Inventors: Sichen Jin, Suwon-si (KR); Kwangyoun Kim, Seoul (KR); Sungsoo Kim, Suwon-si (KR); Junmo Park, Suwon-si (KR); Dhairya Sandhyana, Suwon-si (KR); Changwoo Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 382 days.

(21) Appl. No.: 17/574,214

(22) Filed: Jan. 12, 2022

(65) Prior Publication Data

US 2022/0165291 A1 May 26, 2022

Related U.S. Application Data

(63) Continuation of application No. PCT/KR2021/012656, filed on Sep. 16, 2021.

(30) Foreign Application Priority Data

| Nov. 20, 2020 | (KR) | .......................... | 10-2020-0156527 |
| Mar. 2, 2021 | (KR) | .......................... | 10-2021-0027704 |

(51) Int. Cl.
*G10L 25/30* (2013.01)
*G06N 3/045* (2023.01)

(52) U.S. Cl.
CPC .............. *G10L 25/30* (2013.01); *G06N 3/045* (2023.01)

(58) Field of Classification Search
CPC ................................. G10L 25/30; G06N 3/045
See application file for complete search history.

(56) References Cited

U.S. PATENT DOCUMENTS

| 9,093,076 | B2 | 7/2015 | Fry | |
| 9,153,231 | B1 * | 10/2015 | Salvador | ............... G10L 15/065 |

(Continued)

FOREIGN PATENT DOCUMENTS

| JP | 6851412 B2 | 3/2021 |
| KR | 10-2019-0089628 A | 7/2019 |

(Continued)

OTHER PUBLICATIONS

Search Report dated Dec. 20, 2021, issued by the International Searching Authority in counterpart International Application No. PCT/KR2021/012656 (PCT/ISA/210).

(Continued)

*Primary Examiner* — Pierre Louis Desir
*Assistant Examiner* — Daniel W Chung
(74) *Attorney, Agent, or Firm* — Sughrue Mion, PLLC

(57) ABSTRACT

An electronic apparatus, including a processor connected with a microphone, a memory and a communication interface, and configured to: based on receiving a user voice through the microphone, acquire an operation result by inputting the user voice into the first neural network model, and identify at least one device corresponding to the user voice by inputting the operation result into the second neural network model, and control the communication interface to transmit the operation result to the at least one device, wherein the first neural network model is configured to, after only some layers of a third neural network model trained to identify a text from a voice are additionally trained, include (Continued)

only the additionally trained some layers, and wherein the second neural network model is trained to identify a device corresponding to a voice.

16 Claims, 9 Drawing Sheets

(56) References Cited

U.S. PATENT DOCUMENTS

| | | | | |
|---|---|---|---|---|
| 9,443,527 | B1 * | 9/2016 | Watanabe | G10L 15/30 |
| 10,271,093 | B1 | 4/2019 | Jobanputra et al. | |
| 10,600,406 | B1 | 3/2020 | Shapiro et al. | |
| 10,636,428 | B2 | 4/2020 | Naravanekar | |
| 10,650,819 | B2 | 5/2020 | Huang et al. | |
| 10,872,601 | B1 * | 12/2020 | Acharya | G06F 40/295 |
| 11,037,573 | B2 | 6/2021 | Arantes et al. | |
| 11,222,624 | B2 | 1/2022 | Kim et al. | |
| 11,508,378 | B2 | 11/2022 | Kim et al. | |
| 2005/0071169 | A1 * | 3/2005 | Steinbiss | G10L 15/28 |
| | | | | 704/200 |
| 2015/0025890 | A1 * | 1/2015 | Jagatheesan | G10L 15/183 |
| | | | | 704/255 |
| 2015/0088518 | A1 * | 3/2015 | Kim | G10L 15/08 |
| | | | | 704/251 |
| 2019/0115025 | A1 | 4/2019 | Choi | |
| 2019/0228294 | A1 * | 7/2019 | Hwang | G06N 3/063 |
| 2019/0304450 | A1 | 10/2019 | Kwon | |
| 2019/0385614 | A1 * | 12/2019 | Kim | G10L 15/22 |
| 2020/0075027 | A1 | 3/2020 | Arantes et al. | |
| 2020/0126565 | A1 | 4/2020 | Kim et al. | |
| 2020/0273451 | A1 | 8/2020 | Kim et al. | |
| 2020/0294503 | A1 | 9/2020 | Ryu et al. | |
| 2021/0090555 | A1 * | 3/2021 | Mahmood | G10L 15/1815 |
| 2021/0158165 | A1 * | 5/2021 | Liu | G06N 3/045 |
| 2021/0304763 | A1 * | 9/2021 | Lee | G10L 15/1815 |

FOREIGN PATENT DOCUMENTS

| | | | |
|---|---|---|---|
| KR | 10-2051011 | B1 | 12/2019 |
| KR | 10-2020-0026574 | A | 3/2020 |
| KR | 10-2020-0052804 | A | 5/2020 |
| KR | 10-2020-0058015 | A | 5/2020 |
| KR | 10-2020-0091797 | A | 7/2020 |
| KR | 10-2020-0104773 | A | 9/2020 |
| KR | 10-2020-0109954 | A | 9/2020 |
| KR | 10-2020-0126675 | A | 11/2020 |

OTHER PUBLICATIONS

Written Opinion dated Dec. 20, 2021, issued by the International Searching Authority in counterpart International Application No. PCT/KR2021/012656 (PCT/ISA/237).

Communication dated Apr. 3, 2026 issued by the Korean Ministry of Intellectual Property in counterpart Korean Patent Application No. 10-2021-0027704.

* cited by examiner

100

ELECTRONIC APPARATUS, CONTROL METHOD THEREOF AND ELECTRONIC SYSTEM

CROSS-REFERENCE TO RELATED APPLICATION(S)

This application is a bypass continuation of International Application No. PCT/KR2021/012656, filed on Sep. 16, 2021, which is based on and claims priority to Korean Patent Application No. 10-2020-0156527, filed on Nov. 20, 2020, in the Korean Intellectual Property Office and Korean Patent Application No. 10-2021-0027704, filed on Mar. 2, 2021, in the Korean Intellectual Property Office, the disclosures of which are incorporated by reference herein in their entireties.

BACKGROUND

Field

The disclosure relates to an electronic apparatus and a control method thereof, and more particularly, to an electronic apparatus that controls at least one device among a plurality of devices based on a user voice, a control method thereof and an electronic system.

Description of Related Art

Spurred by the development of electronic technologies, various types of devices are being developed and distributed, and devices equipped with various communication functions are being used in many homes. Further, devices that did not previously have communication functions are equipped with communication functions, and accordingly, a multi device experience (MDE) environment may be used.

In particular, recently, a technology of recognizing a user voice by using a neural network model, and controlling devices in an MDE environment based on the recognition result is being developed.

However, when a new device is added inside an MDE environment, there is a limitation on using a conventional neural network model. For example, if a new device is added inside an MDE environment, the conventional neural network model does not have information about the new device, and thus there is a possibility of malfunction. Or, retraining of the neural network model for the new device is needed, and thus inconvenience is given to a user.

For overcoming these problems, voice recognition may be performed by using a server. In this case, the aforementioned problems can be resolved through a method of updating a neural network model stored in a server periodically or according to a specific event. However, in the case of using a server, problems such as leakage of personal information may occur.

Accordingly, there is a need for the development of a method for recognizing a user voice by using a lightened model of a device included in an MDE environment without using a server, and at the same time, flexibly maintaining a voice recognition function even if a new device is added without causing user inconvenience.

SUMMARY

Provided are electronic apparatus that maintains performance of voice recognition even if the device configuration is changed in a multi device experience (MDE) environment and provides an operation wherein delay is minimized, a control method thereof and an electronic system.

In accordance with an aspect of the disclosure, an electronic apparatus includes a microphone; a memory configured to store a first neural network model and a second neural network model; a communication interface; and a processor connected with the microphone, the memory and the communication interface, and configured to: based on receiving a user voice through the microphone, acquire an operation result by inputting the user voice into the first neural network model, and identify at least one device corresponding to the user voice by inputting the operation result into the second neural network model, and control the communication interface to transmit the operation result to the at least one device, wherein the first neural network model is configured to, after only some layers of a third neural network model trained to identify a text from a voice are additionally trained, include only the additionally trained some layers, and wherein the second neural network model is trained to identify a device corresponding to a voice.

The processor may be further configured to: acquire the operation result in a predetermined time unit by inputting the user voice into the first neural network model in the predetermined time unit, identify the at least one device in the predetermined time unit by inputting the operation result acquired in the predetermined time unit into the second neural network model, and control the communication interface to transmit the operation result acquired in the predetermined time unit to the identified at least one device in the predetermined time unit.

The memory may be further configured to store information about a plurality of devices and information about a plurality of projection layers, and the processor may be further configured to: identify information about a second dimension that can be processed at the at least one device based on the information about the plurality of devices, based on the operation result having a first dimension different from the second dimension, change the operation result to have the second dimension based on projection layers corresponding to the first dimension and the second dimension among the plurality of projection layers, and control the communication interface to transmit the changed operation result having the second dimension to the at least one device.

The memory may be further configured to store information about a plurality of devices and remaining layers of the third neural network model, and the processor may be further configured to: based on identifying that a voice recognition function is not provided in the at least one device based on the information about the plurality of devices, acquire the text corresponding to the user voice by inputting the operation result into the remaining layers, and control the communication interface to transmit the acquired text to the at least one device.

The processor may be further configured to: acquire scores for a plurality of devices by inputting the operation result into the second neural network model, and control the communication interface to transmit the operation result to devices having scores greater than or equal to a threshold value among the acquired scores.

The memory may be further configured to store information about a plurality of projection layers and remaining layers of the third neural network model, and the processor may be further configured to: based on receiving a first response from the at least one device after transmitting the operation result to the at least one device, control the communication interface to transmit a subsequent operation result to the at least one device, and based on receiving a second response from the at least one device after transmitting the operation result to the at least one device, process the operation result with one of the plurality of projection layers or input the operation result into the remaining layers.

The processor may be further configured to: based on the second response including information about a second dimension that can be processed at the at least one device, change a first dimension of the operation result based on projection layers corresponding to the first dimension and the second dimension among the plurality of projection layers, and control the communication interface to transmit the changed operation result to the at least one device, and based on the second response including information that operation information cannot be processed, acquire the text corresponding to the user voice by inputting the operation result into the remaining layers, and control the communication interface to transmit the acquired text to the at least one device.

The first neural network model may be configured to fix weight values of remaining layers of the third neural network model, and after the some layers are additionally trained based on a plurality of sample user voices corresponding to the electronic apparatus and a plurality of sample texts corresponding to the plurality of sample user voices, include only the additionally trained some layers.

The at least one device may be configured to: acquire the text corresponding to the user voice by inputting the operation result into a fourth neural network model stored in the at least one device, and perform an operation corresponding to the acquired text, and the fourth neural network model may be configured to fix weight values of the some layers, and after remaining layers of the third neural network model are additionally trained based on a plurality of sample user voices corresponding to the at least one device and a plurality of sample texts corresponding to the plurality of sample user voices, include only the additionally trained remaining layers.

In accordance with an aspect of the disclosure, a control method of an electronic apparatus includes based on receiving a user voice, acquiring an operation result by inputting the user voice into a first neural network model; identifying at least one device corresponding to the user voice by inputting the operation result into a second neural network model; and transmitting the operation result to the at least one device, wherein the first neural network model may be configured to, after only some layers of a third neural network model trained to identify a text from a voice are additionally trained, include only the additionally trained some layers, and wherein the second neural network model is trained to identify a device corresponding to a voice.

The acquiring may further include acquiring the operation result in a predetermined time unit by inputting the user voice into the first neural network model in the predetermined time unit, the identifying may further include identifying the at least one device in the predetermined time unit by inputting the operation result acquired in the predetermined time unit into the second neural network model, and the transmitting may further include transmitting the operation result acquired in the predetermined time unit to the identified at least one device in the predetermined time unit.

The control method may further include identifying information about a second dimension that can be processed at the at least one device based on information about a plurality of devices; and based on the operation result being having a first dimension different from the second dimension, changing the operation result to have the second dimension based on projection layers corresponding to the first dimension and the second dimension among a plurality of projection layers, and the transmitting may further include transmitting the changed operation result having the second dimension to the at least one device.

The control method may further include based on identifying that a voice recognition function is not provided in the at least one device based on information about a plurality of devices, acquiring the text corresponding to the user voice by inputting the operation result into remaining layers of the third neural network model, and the transmitting may further include transmitting the acquired text to the at least one device.

The identifying may further include acquiring scores for a plurality of devices by inputting the operation result into the second neural network model, and the transmitting may further include transmitting the operation result to devices having scores greater than or equal to a threshold value among the acquired scores.

The control method may further include based on receiving a first response from the at least one device after transmitting the operation result to the at least one device, transmitting a subsequent operation result to the at least one device; and based on receiving a second response from the at least one device after transmitting the operation result to the at least one device, processing the operation result with one of a plurality of projection layers or inputting the operation result into remaining layers of the third neural network model.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
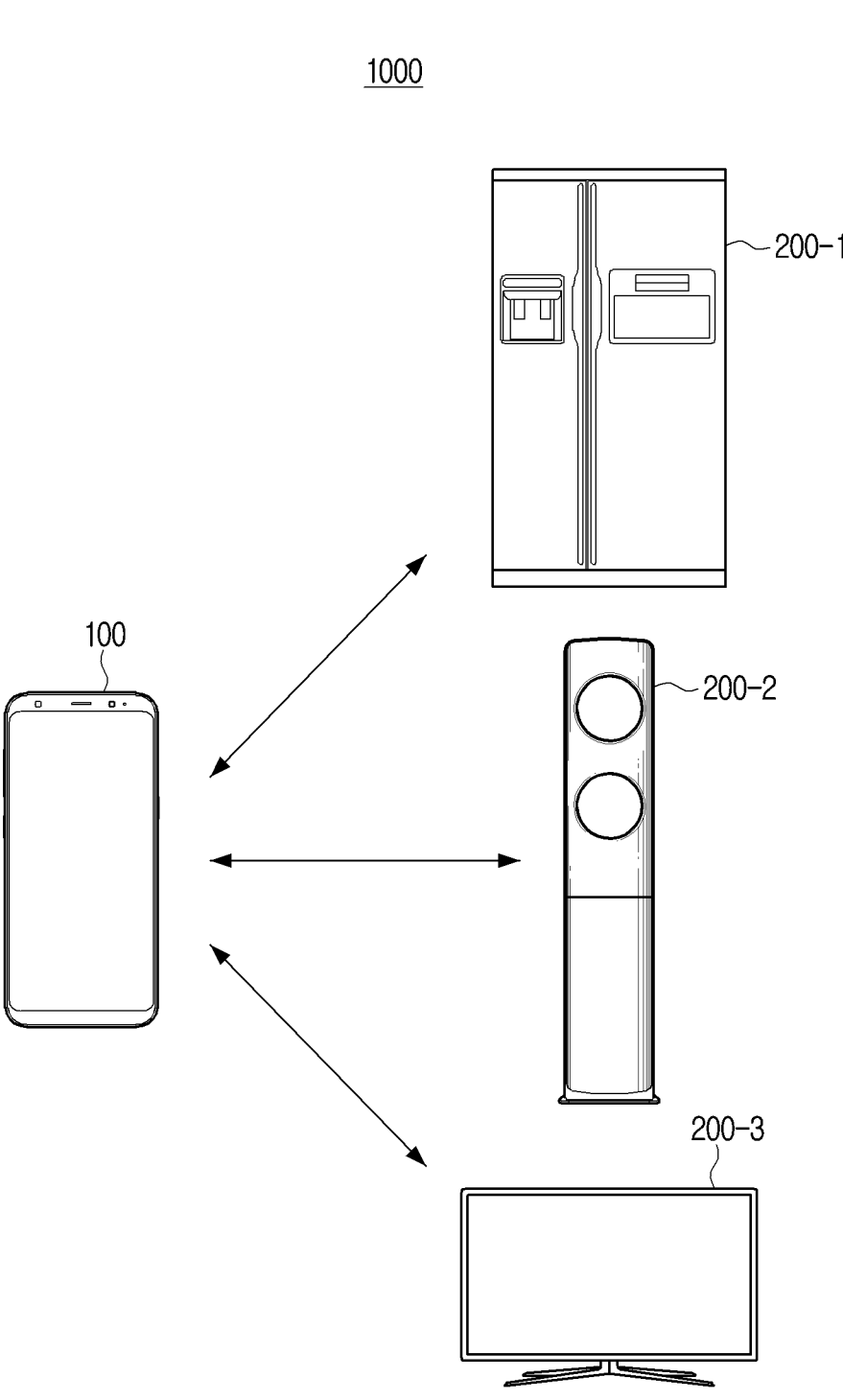
FIG. 1 is a diagram illustrating an electronic system according to an embodiment.

Hereinafter, embodiments will be described in detail with reference to the accompanying drawings.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

The disclosure may address the aforementioned need, and the purpose of the disclosure may be in providing an electronic apparatus that maintains performance of voice recognition even if the device configuration is changed in a multi device experience (MDE) environment and provides an operation wherein delay is minimized, a control method thereof and an electronic system.

As terms used in the embodiments of the disclosure, general terms that are currently used widely were selected as far as possible, in consideration of the functions described in the disclosure. However, the terms may vary depending on the intention of those skilled in the art who work in the pertinent field, previous court decisions, emergence of new technologies, etc. Also, in particular cases, there are terms that were designated by the applicant on his own, and in such cases, the meaning of the terms will be described in detail in the relevant descriptions in the disclosure. Thus, the terms used in the disclosure should be defined based on the meaning of the terms and the overall content of the disclosure, but not just based on the names of the terms.

Also, in this specification, expressions such as "have," "may have," "include," and "may include" should be construed as denoting that there are such characteristics (e.g.: elements such as numerical values, functions, operations, and components), and the terms are not intended to exclude the existence of additional characteristics.

In addition, the expression "at least one of A and/or B" should be interpreted to mean any one of "A" or "B" or "A and B."

Further, the expressions "first," "second," and the like used in this specification may be used to describe various elements regardless of any order and/or degree of importance. Also, such expressions are used only to distinguish one element from another element, and are not intended to limit the elements.

Also, singular expressions include plural expressions, unless defined obviously differently in the context. In addition, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Further, in this specification, the term "user" may refer to a person who uses an electronic apparatus or an apparatus using an electronic apparatus (e.g.: an artificial intelligence electronic apparatus).

Hereinafter, various embodiments of the disclosure will be described in more detail with reference to the accompanying drawings.

FIG. 1 is a diagram illustrating an electronic system 1000 according to an embodiment of the disclosure. As illustrated in FIG. 1, the electronic system 1000 includes an electronic apparatus 100 and a plurality of devices 200-1 to 200-3.

The electronic apparatus 100 is an apparatus that receives user voices, and it may be a smartphone, a tablet PC, a wearable apparatus, etc. In FIG. 1, it is illustrated that the electronic apparatus 100 is a smartphone, for the convenience of explanation, but the disclosure is not limited thereto, and the electronic apparatus 100 can be any apparatus that can receive a user voice and control at least one device among a plurality of devices 200-1 to 200-3.

The electronic apparatus 100 may store a neural network model wherein some layers of a voice recognition neural network model were retrained, and process a user voice by using the stored neural network model. Here, retraining of some layers may be retraining for fixing weight values of the remaining layers of the voice recognition neural network model, and then reinforcing the voice recognition function through various voice samples.

For example, in case the electronic apparatus 100 is a smartphone as in FIG. 1, various voice samples may be voices uttered in front of the smartphone. That is, a voice sample used in learning may be a text corresponding to a voice uttered in front of the smartphone.

The electronic apparatus 100 may input a user voice into the retrained some layers and acquire an operation result, and transmit the acquired operation result to at least one of the plurality of devices 200-1 to 200-3.

Here, the electronic apparatus 100 may identify at least one device corresponding to the user device by using a neural network model trained to identify a device corresponding to a voice, and transmit the acquired operation result to the identified device.

The plurality of devices 200-1 to 200-3 are devices that receive an operation result from the electronic apparatus 100 and perform an operation corresponding thereto, and in FIG. 1, device 200-1 is illustrated as a refrigerator, device 200-2 is illustrated as an air conditioner, and device 200-3 is illustrated as a television, for convenience of explanation. However, the disclosure is not limited thereto, and the plurality of devices 200-1 to 200-3 can be any devices that can receive an operation result from the electronic apparatus 100 and perform an operation corresponding thereto.

Each of the plurality of devices 200-1 to 200-3 may store a neural network model wherein the remaining layers of a voice recognition neural network model were retrained, and perform an operation corresponding to the operation result by using the stored neural network model. Here, retraining of the remaining layers may be retraining for fixing weight values of some layers of the voice recognition neural network model, and then performing voice recognition optimized for a device through voice samples for each device.

For example, in the case of a TV, the remaining layers may be retrained by using voice samples used for controlling the TV such as volume up, volume down, channel up, channel down, etc., and texts corresponding thereto. As another example, in the case of an air conditioner, the remaining layers may be retrained by using voice samples used for controlling the air conditioner such as raise the temperature, lower the temperature, the sleeping mode, etc., and texts corresponding thereto.

Each of the plurality of devices 200-1 to 200-3 may input the operation result into the retrained remaining layers and acquire a text corresponding to the user voice, and perform an operation corresponding to the acquired text.

As described above, the electronic apparatus 100 and the plurality of devices 200-1 to 200-3 may respectively store a neural network model wherein specific layers of a voice recognition neural network model were retrained, and perform an operation corresponding to a user voice.

In FIG. 1, it is illustrated that the number of the plurality of devices 200-1 to 200-3 is three, but the disclosure is not limited thereto. For example, any number of devices may be added to or removed from the plurality of devices 200-1 to 200-3. Also, only one device but not the plurality of devices 200-1 to 200-3 may be connected with the electronic apparatus 100.

In FIG. 1, it is illustrated that the electronic apparatus 100 and the plurality of devices 200-1 to 200-3 are directly connected, but they may also be connected through a device like an access point.

Figure 2:
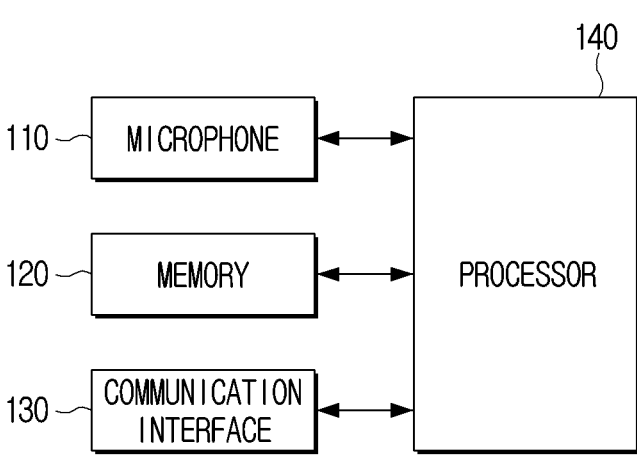
FIG. 2 is a block diagram illustrating a configuration of an electronic apparatus according to an embodiment.

FIG. 2 is a block diagram illustrating a configuration of the electronic apparatus 100 according to an embodiment of the disclosure. As illustrated in FIG. 2, the electronic apparatus 100 includes a microphone 110, a memory 120, a communication interface 130, and a processor 140.

The microphone 110 is a component for receiving input of a user voice and converting the voice into an audio signal. The microphone 110 is electronically connected with the processor 140, and it may receive a user voice by control of the processor 140. Here, the user voice may include a voice generated from at least one of the electronic apparatus 100 or another electronic apparatus around the electronic apparatus 100 and noises around the electronic apparatus 100.

For example, the microphone 110 may be formed as an integrated type that is integrated with the upper side or front surface direction, the side surface direction, etc. of the electronic apparatus 100. In embodiments, the microphone 110 may be provided on a remote control that is a separate component from the electronic apparatus 100. In this case, the remote control may receive a sound through the microphone 110, and provide the received sound to the electronic apparatus 100.

The microphone 110 may include various components such as a microphone that collects a sound in an analogue form, an amp circuit that amplifies the collected sound, an A/D conversion circuit that samples the amplified sound and converts the sound into a digital signal, a filter circuit that removes noise components from the converted digital signal, etc.

The microphone 110 may include a plurality of sub microphones. For example, the microphone 110 may respectively include one sub microphone on the front, rear, left, and right parts of the electronic apparatus 100. However, the disclosure is not limited thereto, and the electronic apparatus 100 may include only one microphone 110.

In embodiments, the microphone 110 may also be implemented in a form of a sound sensor.

The memory 120 may refer to hardware that stores information such as data, etc. in a form of electricity or magneticity so that the processor 140, etc. can use. For this, the memory 120 may be implemented as at least one hardware among a non-volatile memory, a volatile memory, a flash memory, a hard disc drive (HDD) or a solid state drive (SSD), a RAM, a ROM, etc.

In the memory 120, at least one instruction or module used for operations of the electronic apparatus 100 or the processor 140 may be stored. Here, an instruction may be a code unit that instructs an operation of the electronic apparatus 100 or the processor 140, and it may have been drafted in a machine language which is a language that can be understood by a computer. In embodiments, a module may be a set of a series of instructions, for example an instruction set, that perform specific operations in work units.

In the memory 120, data which is information in bit or byte units that can express characters, numbers, images, etc. may be stored. For example, in the memory 120, a first neural network model and a second network model may be stored. Here, the first neural network model may be a model configured to, after only some layers of a third neural network model trained to identify a text from a voice are additionally trained, include only the additionally trained some layers, and the second neural network model may be a model trained to identify a device corresponding to a voice.

In the memory 120, a user voice processing module, information about a plurality of projection layers, information about a plurality of devices and the remaining layers of the third neural network model, etc. may be stored.

The memory 120 may be accessed by the processor 140, and reading/recording/correcting/deleting/updating, etc. of instructions, modules or data may be performed by the processor 140.

The communication interface 130 is a component capable of performing communication with various types of external devices according to various types of communication methods. For example, the electronic apparatus 100 may perform communication with the plurality of devices 200-1 to 200-3 through the communication interface 130.

The communication interface 130 may include a Wi-Fi module, a Bluetooth module, an infrared communication module and a wireless communication module, etc. Here, each communication module may be implemented in the form of at least one hardware chip.

A Wi-Fi module and a Bluetooth module perform communication by a Wi-Fi method and a Bluetooth method, respectively. In the case of using a Wi-Fi module or a Bluetooth module, various types of connection information such as an SSID and a session key is transmitted and received first, and connection of communication is performed by using the information, and various types of information can be transmitted and received thereafter. In embodiments, an infrared communication module performs communication according to an infrared Data Association (IrDA) technology of transmitting data to a near field wirelessly by using infrared rays between visible rays and millimeter waves.

A wireless communication module may include at least one communication chip that performs communication according to various wireless communication protocols such as Zigbee, 3rd generation (3G), 3rd generation partnership project (3GPP), Long Term Evolution (LTE), LTE Advanced (LTE-A), 4th Generation (4G), 5th Generation (5G), etc. other than the aforementioned communication methods.

In embodiments, the communication interface 130 may include wired communication interfaces such as an HDMI, a DP, a Thunderbolt, a USB, an RGB, a D-SUB, a DVI, etc.

Other than the above, the communication interface 130 may include at least one of a local area network (LAN) module, an Ethernet module, or a wired communication module performing communication by using a pair cable, a coaxial cable, or an optical fiber cable, etc.

The processor 140 controls the overall operations of the electronic apparatus 100. Specifically, the processor 140 may be connected with each components of the electronic apparatus 100 and control the overall operations of the electronic apparatus 100. For example, the processor 140 may be connected with components such as the microphone 110, the memory 120, the communication interface 130, etc. and control the operations of the electronic apparatus 100.

According to an embodiment of the disclosure, the processor 140 may be implemented as a digital signal processor (DSP), a microprocessor, and a time controller (TCON). However, the disclosure is not limited thereto, and the processor 140 may include one or more of a central processing unit (CPU), a micro controller unit (MCU), a micro processing unit (MPU), a controller, an application processor (AP), or a communication processor (CP), and an ARM processor, or may be defined by the terms. Also, the processor 140 may be implemented as a system on chip (SoC) having a processing algorithm stored therein or large scale integration (LSI), or in the form of a field programmable gate array (FPGA).

If a user voice is received through the microphone 110, the processor 140 may input the user voice into the first neural network model and acquire an operation result, and input the operation result into the second neural network model and identify at least one device corresponding to the user voice. Here, the first neural network model may be a model configured to, after only some layers of a third neural network model trained to identify a text from a voice are additionally trained, include only the additionally trained some layers, the second neural network model may be a model trained to identify a device corresponding to a voice, and the third neural network model may be a neural network model trained to perform voice recognition. In particular, the first neural network model may be a model configured to fix weight values of the remaining layers of the third neural network model, and after some of the layers are additionally trained based on a plurality of sample user voices corresponding to the electronic apparatus 100 and a plurality of sample texts corresponding to the plurality of sample user voices, include only the additionally trained some layers. Through such additional training, the first neural network model may output a voice recognition result that further reflects the characteristics of the surrounding environment of the electronic apparatus 100 as an operation result.

The processor 140 may control the communication interface 130 to transmit the operation result to the at least one device. For example, the processor 140 may input the operation result into the second neural network model and acquire scores for the plurality of respective devices, and control the communication interface 130 to transmit the operation result to the devices having scores greater than or equal to a threshold value among the acquired scores.

The processor 140 may input the user voice into the first neural network model in a predetermined time unit and acquire the operation result in the predetermined time unit, input the operation result acquired in the predetermined time unit into the second neural network model and identify the at least one device in the predetermined time unit, and control the communication interface 130 to transmit the operation result acquired in the predetermined time unit to the identified at least one device in the predetermined time unit. For example, the processor 140 may input the user voice into the first neural network model in a unit of 25 ms and acquire an operation result in the unit of 25 ms, input the operation result acquired in the unit of 25 ms into the second neural network model and identify the at least one device in the unit of 25 ms, and control the communication interface 130 to transmit the operation result acquired in the unit of 25 ms to the identified at least one device in the unit of 25 ms.

In embodiments, the memory 120 may further store information about a plurality of devices and information about a plurality of projection layers, and the processor 140 may identify information about a second dimension that can be processed at the at least one device based on the information about the plurality of devices, and in case an operation result having a first dimension different from the second dimension, change the operation result to have the second dimension based on projection layers corresponding to the first dimension and the second dimension among the plurality of projection layers, and control the communication interface 130 to transmit the changed operation result of the second dimension to the at least one device.

For example, in case an operation result may be a 1536th dimension, but a device to which the operation result will be transmitted is a 512th dimension, the processor 140 may change the dimension of the operation result to the 512th dimension based on projections layers of 1536×512 stored in the memory 120, and transmit the operation result having the changed dimension to the device.

Here, the information about the plurality of devices may be information received from the devices at the time when the electronic apparatus 100 and the devices were initially connected. However, the disclosure is not limited thereto, and information about the plurality of devices may not be stored in the memory 120. In this case, the processor 140 may request information about a dimension that can be processed to the device to which the operation result will be transmitted and receive the information, and determine whether to use the projection layers based on the received information.

In embodiments, the memory 120 may further store information about a plurality of devices and the remaining layers of the third neural network model, and the processor 140 may, if it is identified that a voice recognition function is not provided in the at least one device based on the information about the plurality of devices, input the operation result into the remaining layers and acquire a text corresponding to the user voice, and control the communication interface 130 to transmit the acquired text to the at least one device. That is, in case the device does not have capacity to process an operation result, the processor 140 may perform the remaining processing for the operation result and acquire a text corresponding to the user voice, and provide the acquired text to the device. In this case, the device may perform only an operation corresponding to the text.

In embodiments, the memory 120 may further store information about a plurality of projection layers and the remaining layers of the third neural network model, and the processor 140 may, if a first response is received from the at least one device after transmitting the operation result to the at least one device, control the communication interface 130 to transmit an operation result acquired afterwards to the at least one device. For example, after the processor 140 transmitted the operation result to the at least one device, if an affirmative response or an ok response is received from the at least one device, the processor 140 may transmit an operation result acquired afterwards to the at least one device.

In embodiments, after the processor 140 has transmitted the operation result to the at least one device, if a second response is received from the at least one device, the processor 140 may process the operation result with one of the plurality of projection layers or input the operation result into the remaining layers.

Specifically, if the second response is information about a dimension that can be processed at the at least one device, the processor 140 may change the dimension of the operation result based on projection layers corresponding to the dimension of the operation result and the dimension that can be processed at the at least one device among the plurality of projection layers, and control the communication interface 130 to transmit the operation result of which dimension was changed to the at least one device, and if the second response is information that the operation information cannot be processed, the processor 140 may input the operation result into the remaining layers and acquire a text corresponding to the user voice, and control the communication interface 130 to transmit the acquired text to the at least one device.

In embodiments, the at least one device may input the operation result into a fourth neural network model stored in the at least one device and acquire a text corresponding to the user voice, and perform an operation corresponding to the acquired text. Here, the fourth neural network model may be a model configured to fix weight values of some of the layers, and after the remaining layers of the third neural network model are additionally trained based on a plurality of sample user voices corresponding to the at least one device and a plurality of sample texts corresponding to the plurality of sample user voices, include only the additionally trained remaining layers. Through such additional training, the fourth neural network model may output a voice recognition result that further considers a control command of the device as a text.

In embodiments, functions related to artificial intelligence according to the disclosure may be operated through the processor 140 and the memory 120.

The processor 140 may include one processor or a plurality of processors. Here, the at least one processor may be a generic-purpose processor such as a CPU, an AP, a digital signal processor (DSP), etc., a graphic-dedicated processor such as a GPU and a vision processing unit (VPU), or an artificial intelligence-dedicated processor such as an NPU.

The at least one processor may perform control to process input data according to a predefined operation rule or an artificial intelligence model stored in the memory. In embodiments, in case the at least one processor is at least one artificial intelligence-dedicated processor, the at least one artificial intelligence-dedicated processor may be designed as a hardware structure specialized for processing of specific artificial intelligence models. The predefined operation rule or the artificial intelligence model may be made through learning.

Here, being made through learning means that a basic artificial intelligence model is trained by using a plurality of learning data by a learning algorithm, and a predefined operation rule or an artificial intelligence model set to perform a desired characteristic or, for example a purpose, is made. Such learning may be performed in a device itself wherein artificial intelligence is performed according to the disclosure, or performed through a separate server and/or system. Examples of learning algorithms may include supervised learning, unsupervised learning, semi-supervised learning, or reinforcement learning, but learning algorithms are not limited to the aforementioned examples.

An artificial intelligence model may consist of a plurality of neural network layers. Each of the plurality of neural network layers has a plurality of weight values, and performs a neural network operation through an operation between the operation result of the previous layer and the plurality of weight values. The plurality of weight values included by the plurality of neural network layers may be optimized by the learning result of the artificial intelligence model. For example, the plurality of weight values may be updated such that a loss value or a cost value acquired at the artificial intelligence model during a learning process is reduced or minimized.

An artificial neural network may include a deep neural network (DNN). Examples of a neural network may include a convolutional neural network (CNN), a deep neural network (DNN), a recurrent neural network (RNN), a restricted Boltzmann machine (RBM), a deep belief network (DBN), a bidirectional recurrent deep neural network (BRDNN) or deep Q-networks, but the neural network in the disclosure is not limited to the aforementioned examples.

As described above, through additional training of a neural network model, a voice recognition function can be improved, and even if a device is added, voice recognition can be performed without an additional training operation.

Hereinafter, examples of the operation of the electronic apparatus 100 will be described in more detail with reference to FIG. 3 to FIG. 8. In FIG. 3 to FIG. 8, independent embodiments will be described for the convenience of explanation. However, the independent embodiments in FIG. 3 to FIG. 8 can obviously be carried out in a combined state.

Figure 3:
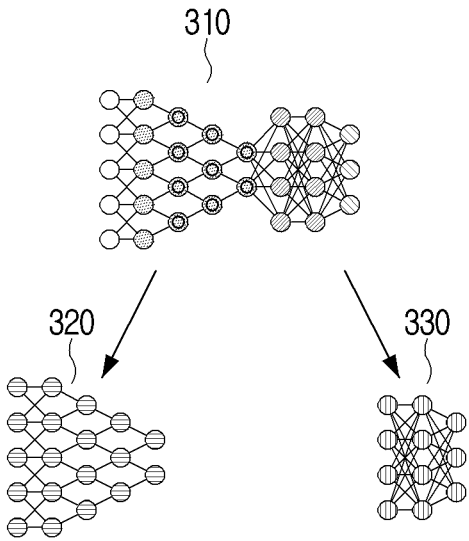
FIG. 3 is a diagram for illustrating additional training of a neural network model according to an embodiment.

FIG. 3 is a diagram for illustrating additional training of a neural network model according to an embodiment of the disclosure.

The upper part of FIG. 3 illustrates an example of the third neural network model 310 trained to perform voice recognition.

The left lower part of FIG. 3 illustrates an example of the first neural network model 320 configured to, after only some layers near the input end of the third neural network model 310 are additionally trained, include only the additionally trained some layers. The first neural network model 320 may be a model configured to fix weight values of the remaining layers near the output end of the third neural network model 310, and after some of the layers are additionally trained based on a plurality of sample user voices corresponding to the electronic apparatus 100 and a plurality of sample texts corresponding to the plurality of sample user voices, include only the additionally trained some layers.

For example, in case the electronic apparatus 100 is a TV, after some layers of the third neural network model 310 are additionally trained through sounds of the TV itself, sample user voices including user voices and texts corresponding thereto, the first neural network model 320 may be configured with the additionally trained some layers of the third neural network model 310. Through such additional training, even if a user voice including sounds of the TV itself is input, the voice recognition function can be maintained. Such an effect can be applied not only to a TV, but also to a smartphone, a refrigerator, a washing machine, etc. in the same manner.

The right lower part of FIG. 3 illustrates an example of the fourth neural network model 330 configured to, after only the remaining layers near the output end of the third neural network model 310 are additionally trained, include only the additionally trained remaining layers. The fourth neural network model 330 may be a model configured to fix weight values of some of the layers near the input end of the third neural network model 310, and after the remaining layers are additionally trained based on a plurality of sample user voices corresponding to the device and a plurality of sample texts corresponding to the plurality of sample user voices, include only the additionally trained remaining layers.

For example, in case the device is a TV, the remaining layers may be retrained by using voice samples used for controlling the TV such as volume up, volume down, channel up, channel down, etc., and texts corresponding thereto. In embodiments, in case the device is an air conditioner, the remaining layers may be retrained by using voice samples used for controlling the air conditioner such as raise the temperature, lower the temperature, the sleeping mode, etc., and texts corresponding thereto. Through such additional training, the possibility that a user voice may be output as a text corresponding to each device is improved.

Figure 4:
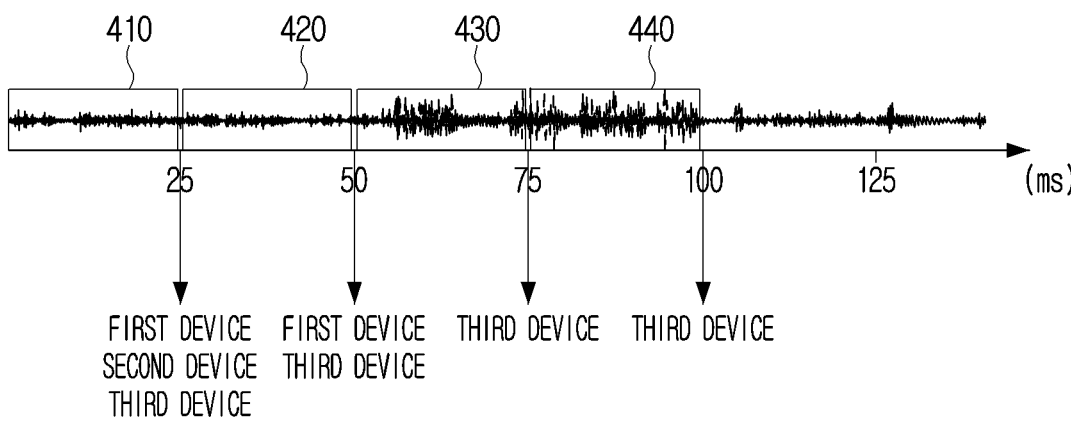
FIG. 4 is a diagram for illustrating an identifying operation of a device according to an embodiment.

FIG. 4 is a diagram for illustrating an identifying operation of a device according to an embodiment of the disclosure.

As illustrated in FIG. 4, the processor 140 may input a user voice into the first neural network model in a unit of 25 ms and acquire an operation result in the unit of 25 ms, input the operation result acquired in the unit of 25 ms into the second neural network model and identify at least one device in the unit of 25 ms, and control the communication interface 130 to transmit the operation result acquired in the unit of 25 ms to the identified at least one device in the unit of 25 ms.

That is, the processor 140 may input a user voice in the 410 section into the first neural network model and acquire an operation result corresponding to the 410 section, and input the operation result corresponding to the 410 section into the second neural network model and identify a first device, a second device, and a third device corresponding to the 410 section. Here, the processor 140 may acquire scores for the plurality of respective devices, and identify the first device, the second device, and the third device having scores greater than or equal to a threshold value. The processor 140 may transmit the operation result corresponding to the 410 section to the first device, the second device, and the third device.

Then, the processor 140 may input a user voice in the 420 section into the first neural network model and acquire an operation result corresponding to the 420 section, and input the operation result corresponding to the 420 section into the second neural network model and identify a first device and a third device corresponding to the 420 section. The processor 140 may transmit the operation result corresponding to the 420 section to the first device and the third device.

Then, the processor 140 may input a user voice in the 430 section into the first neural network model and acquire an operation result corresponding to the 430 section, and input the operation result corresponding to the 430 section into the second neural network model and identify a third device corresponding to the 430 section. The processor 140 may transmit the operation result corresponding to the 430 section to the third device.

By the method described above, the processor 140 may identify a device to which an operation result will be transmitted. That is, a device to which an operation result will be transmitted may be a device corresponding to a user voice. As each section of such an operation may be very short, the final device for transmission may be determined before deriving a text from the device. In FIG. 4, the first device receives an operation result during 50 ms, but as an additional operation result is not received, a text cannot be derived. This is same for the second device. Ultimately, only the third device may continuously receive operation results and acquire a text, and perform an operation corresponding to the text.

In contrast, the third device processes an operation result received in a unit of 25 ms in real time, and thus the speed of acquiring a text can be improved compared to a conventional device. In case a conventional device does not provide an operation result by a predetermined time section, and identifies a device corresponding to a user voice based on the entire time units of the user voice, the user voice is transmitted to the corresponding device only after the entire user voice is processed. In this case, the delay time may be a time of processing the entire user voice. In contrast, according to the disclosure, a device receives an operation result per 25 ms and processes the result, and thus the delay time may be about 25 ms, but not the time of processing the entire user voice. Accordingly, as an operation result is transmitted in a section unit, the speed of voice recognition can be improved.

In embodiments, in FIG. 4, 25 ms is illustrated as a predetermined time unit, but the disclosure is not limited thereto, and numerous various time sections can be set according to the hardware specification, the time for processing an operation result in each time section, etc.

Figure 5:
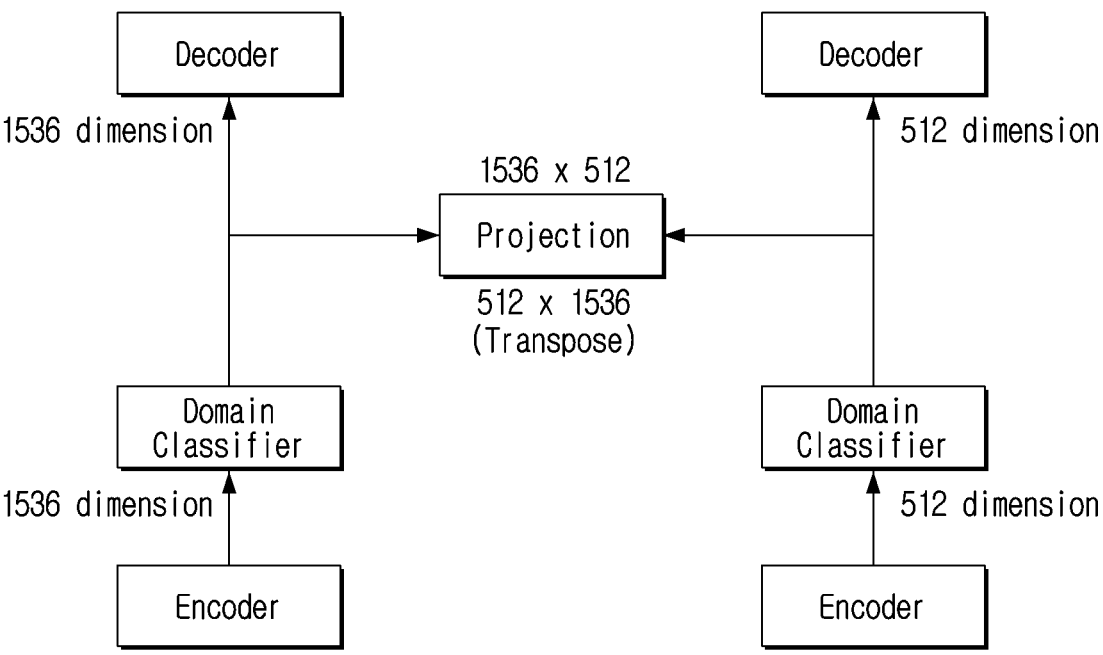
FIG. 5 is a diagram for illustrating a projection layer according to an embodiment.

FIG. 5 is a diagram for illustrating a projection layer according to an embodiment of the disclosure.

As illustrated in FIG. 5, if an operation result which is an output of the first neural network model is 1536th dimension, and a dimension that can be processed at the device is 512th dimension, the processor 140 may change the operation result to the 512th dimension through projections layers of 1536×512, and provide the changed operation result to the device.

However, the disclosure is not limited thereto, and if it is identified that the device stores projections layers of 1536× 512, the processor 140 may provide the operation result of the 1536 dimension to the device, and the device may change the dimension of the operation result.

In embodiments, in FIG. 5, projection layers of 1536×512 are illustrated, but projection layers in numerous various forms can exist.

Figure 6:
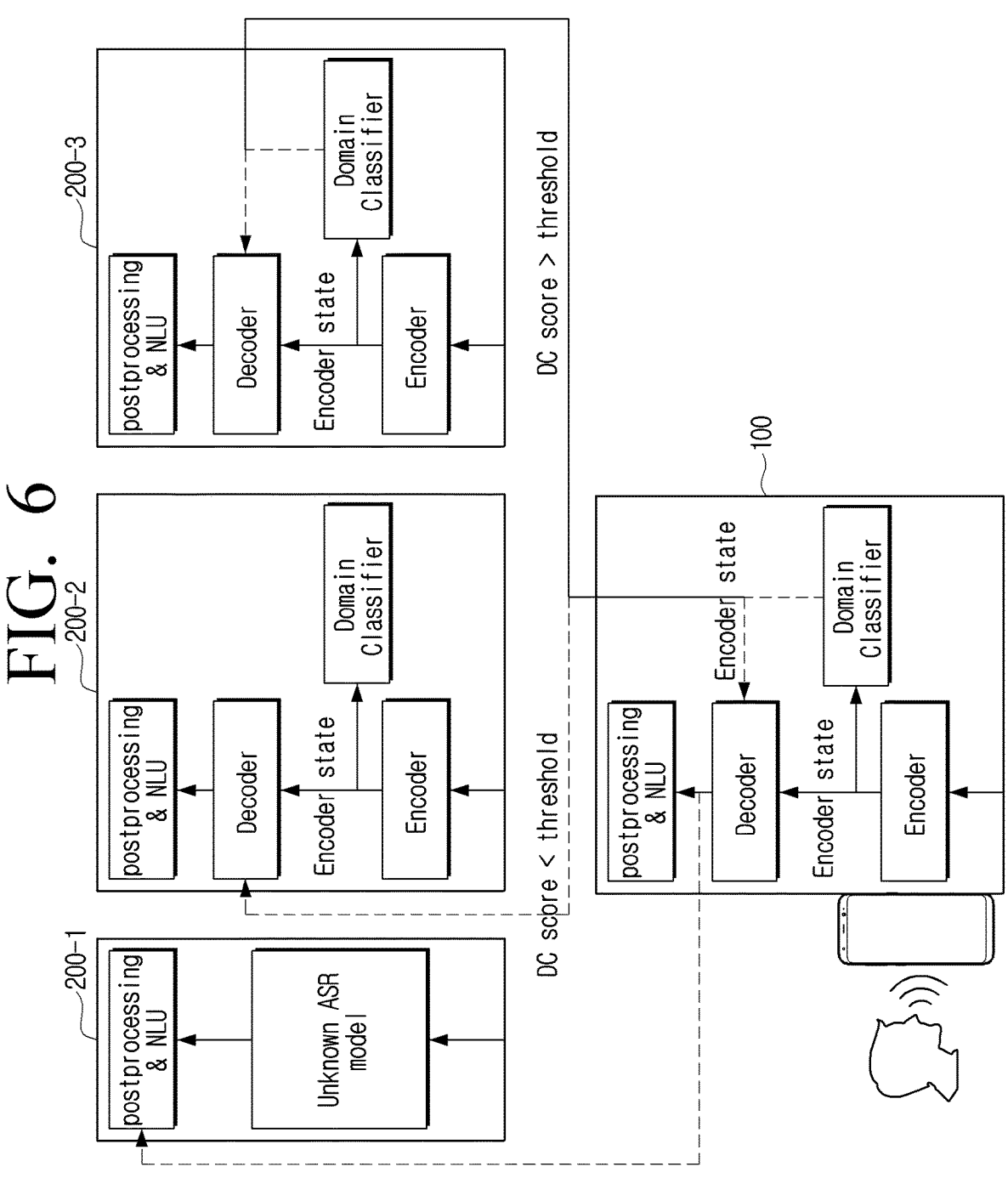
FIG. 6 is a diagram for illustrating an operation of an electronic apparatus according to a device type according to an embodiment.

FIG. 6 is a diagram for illustrating an operation of the electronic apparatus 100 according to a device type according to an embodiment of the disclosure.

The processor 140 of the electronic apparatus 100 may input a user voice into the first neural network model, which may be illustrated for example as an Encoder and acquire an operation result, which may be illustrated for example as an Encoder state. Then, the processor 140 may input the operation result into the second neural network model, which may be illustrated for example as a Domain Classifier, and identify at least one device corresponding to the user voice (Domain Classifier). Here, the first neural network model may be a model configured to, after only some layers of a third neural network model trained to identify a text from a voice are additionally trained, include only the additionally trained some layers, and the second neural network model may be a model trained to identify a device corresponding to a voice.

If the first device 200-1 is a device corresponding to the user device but a device that cannot process the operation result, the processor 140 may input the operation result into the remaining layers of the third neural network model, which may be illustrated for example as a Decoder, and acquire a text corresponding to the user voice, and provide the text to the first device 200-1.

If the second device 200-2 and the third device 200-3 are devices that can process the operation result, the processor 140 may transmit the operation result to at least one of the second device 200-2 or the third device 200-3 based on the output of the second neural network model. In FIG. 6, the third device 200-3 is a device corresponding to the user voice, and the processor 140 may transmit the operation result to the third device 200-3.

The third device 200-3 may input the operation result into the fourth neural network model and acquire a text corresponding to the user voice, and perform an operation corresponding to the acquired text. Here, the fourth neural network model may be a model configured to fix weight values of some of the layers, and after the remaining layers of the third neural network model are additionally trained based on a plurality of sample user voices corresponding to the at least one device and a plurality of sample texts corresponding to the plurality of sample user voices, include only the additionally trained remaining layers.

Figure 7:
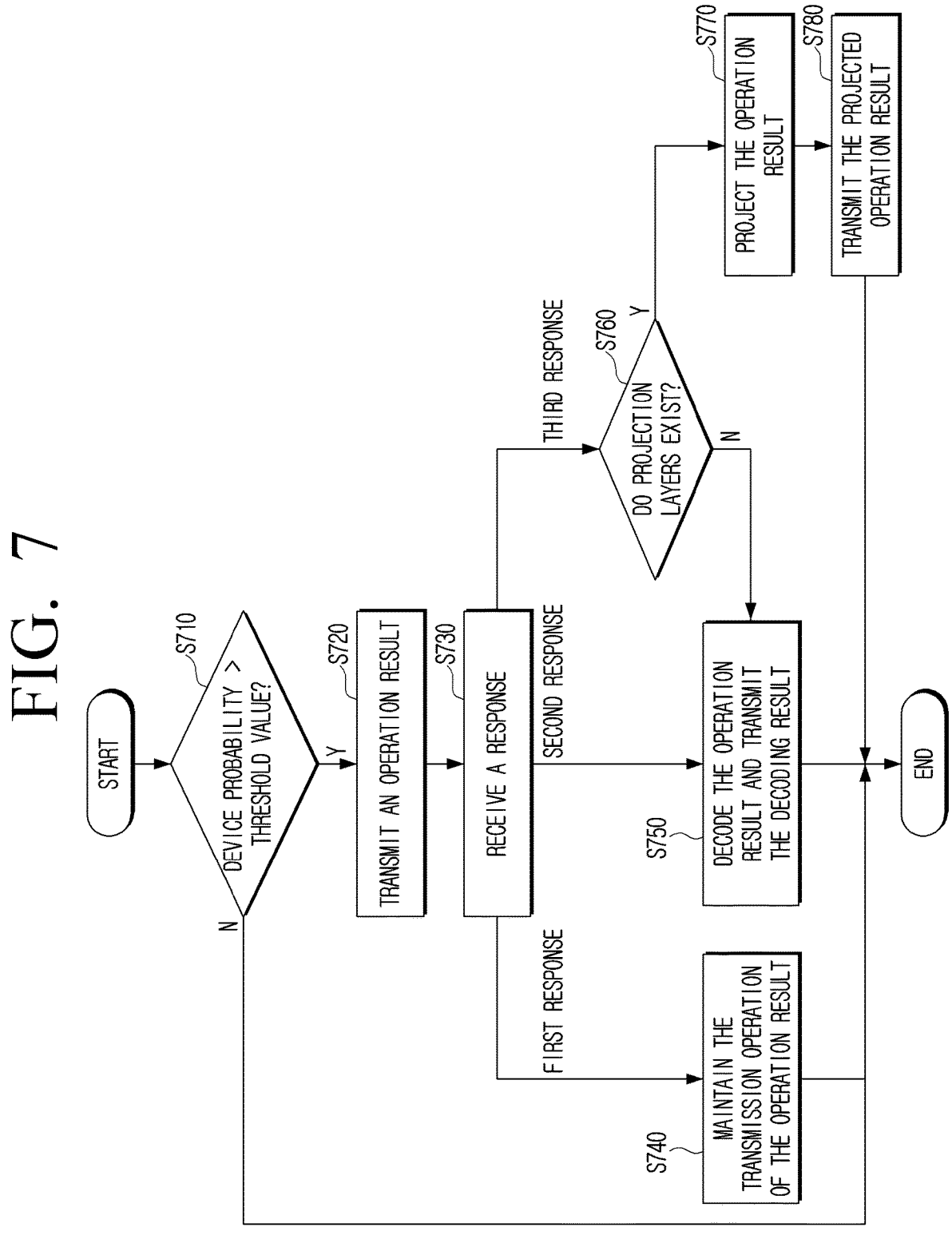
FIG. 7 is a flow chart for illustrating an operation of an electronic apparatus according to a response of a device according to an embodiment.

FIG. 7 is a flow chart for illustrating an operation of the electronic apparatus 100 according to a response of a device according to an embodiment of the disclosure.

First, the processor 140 identifies whether the device probability, for example a score, exceeds a threshold value in operation S710. If the device probability exceeds the threshold value, the processor 140 may transmit an operation result in operation S720, and if the device probability does not exceed the threshold value, the processor 140 may not perform an additional operation.

The processor 140 may transmit the operation result, and receive a response from the device in operation S730.

When a first response is received, the processor 140 may maintain the transmitting operation of the operation result in operation S740. For example, if an affirmative response or an ok response is received, the processor 140 may maintain the transmitting operation of the operation result.

In embodiments, when a second response is received, the processor 140 may decode the operation result and transmit the decoding result in operation S750. For example, if a response that the device cannot process the operation result is received, the processor 140 may acquire a text from the operation result, and transmit the acquired text to the device.

In embodiments, when a third response is received, the processor 140 may identify whether projection layers exist in operation S760. For example, the processor 140 may receive information that processing of the operation result is possible, but the dimension that can be processed is different from the dimension of the operation result from the device. In this case, if projection layers do not exist, the processor 140 may decode the operation result and transmit the decoding result in operation S750. In embodiments, if projection layers exist, the processor 140 may project the operation result in operation S770 and change the dimension, and transmit the projected operation result to the device in operation S780.

Figure 8:
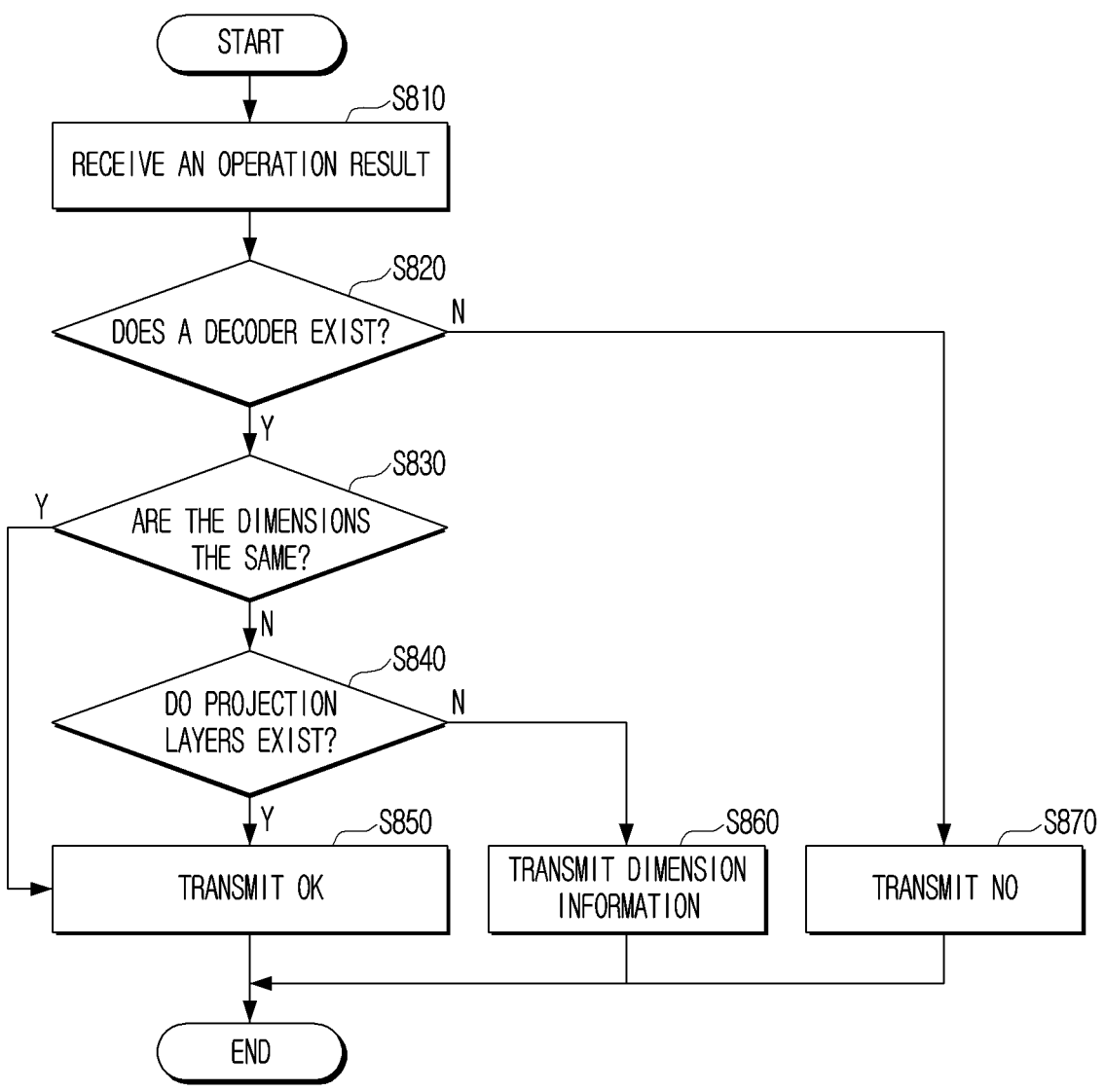
FIG. 8 is a flow chart for illustrating an operation of a device according to an embodiment.

FIG. 8 is a flow chart for illustrating an operation of a device according to an embodiment of the disclosure.

First, the device may receive an operation result from the electronic apparatus 100 in operation S810. Then, the device may identify whether a decoder exists in operation S820. That is, if the operation result can be processed, the device may identify whether the dimension that can be processed and the dimension of the operation result are the same in operation S830, and if the operation result cannot be processed, the device may transmit a no response to the electronic apparatus 100 in operation S870.

If the dimensions are the same, the device may transmit an ok response to the electronic apparatus 100 in operation S850, and if the dimensions are not the same, the device may identify whether projection layers exist in operation S840.

If projection layers exist, the device may transmit ok to the electronic apparatus 100 in operation S850, and if projection layers do not exist, the device may transmit information about the dimension that the device can process in operation S860.

If the dimensions are the same, the device may use the operation result received from the electronic apparatus 100 as it is, and if the dimensions are not the same and projection layers exist, the device may change the dimension of the operation result received from the electronic apparatus 100 based on the projection layers and use the operation result.

Figure 9:
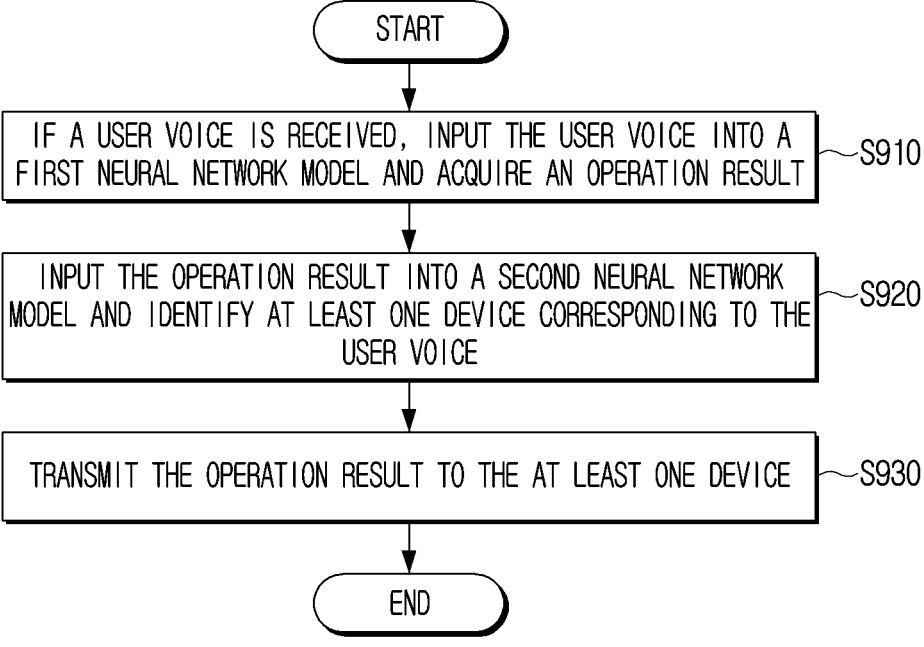
FIG. 9 is a flow chart for illustrating a control method of an electronic apparatus according to an embodiment.

FIG. 9 is a flow chart for illustrating a control method of an electronic apparatus according to an embodiment of the disclosure.

First, if a user voice is received, the user voice is input into a first neural network model and an operation result is acquired in operation S910. Then, the operation result is input into a second neural network model and at least one device corresponding to the user voice is identified in operation S920. Then, the operation result is transmitted to the at least one device in operation S930. Here, the first neural network model may be a model configured to, after only some layers of a third neural network model trained to identify a text from a voice are additionally trained, include only the additionally trained some layers, and the second neural network model may be a model trained to identify a device corresponding to a voice.

Here, in the acquiring operation S910, the user voice may be input into the first neural network model in a predetermined time unit and the operation result may be acquired in the predetermined time unit, and in the identifying operation S920, the operation result acquired in the predetermined time unit may be input into the second neural network model and the at least one device may be identified in the predetermined time unit. Then, in the transmitting operation S930, the operation result acquired in the predetermined time unit may be transmitted to the identified at least one device in the predetermined time unit.

Also, the control method may further include the steps of identifying information about a second dimension that can be processed at the at least one device based on information about a plurality of devices, and based on the operation result having a first dimension different from the second dimension, changing the operation result to have the second dimension based on projection layers corresponding to the first dimension and the second dimension among the plurality of projection layers, and in the transmitting operation S930, the changed operation result of the second dimension may be transmitted to the at least one device.

In embodiments, the control method may further include the step of, based on identifying that a voice recognition function is not provided in the at least one device based on the information about the plurality of devices, inputting the operation result into the remaining layers of the third neural network model and acquiring a text corresponding to the user voice, and in the transmitting operation S930, the acquired text may be transmitted to the at least one device.

Also, in the identifying operation S920, the operation result may be input into the second neural network model and scores for the plurality of respective devices may be acquired, and in the transmitting operation S930, the operation result may be transmitted to the devices having scores greater than or equal to a threshold value among the acquired scores.

In embodiments, the control method may further include the steps of, based on receiving a first response from the at least one device after transmitting the operation result to the at least one device, transmitting an operation result acquired afterwards to the at least one device, and based on receiving a second response from the at least one device after transmitting the operation result to the at least one device, processing the operation result with one of the plurality of projection layers or inputting the operation result into the remaining layers of the third neural network model.

Here, in the inputting operation, based on the second response being information about a dimension that can be processed at the at least one device, the dimension of the operation result may be changed based on projection layers corresponding to the dimension of the operation result and the dimension that can be processed at the at least one device among the plurality of projection layers, and the operation result of which dimension was changed may be transmitted to the at least one device, and based on the second response being information that the operation information cannot be processed, the operation result may be input into the remaining layers and a text corresponding to the user voice may be acquired, and the acquired text may be transmitted to the at least one device.

In embodiments, the first neural network model may be a model configured to fix weight values of the remaining layers of the third neural network model, and after some of the layers are additionally trained based on a plurality of sample user voices corresponding to the electronic apparatus and a plurality of sample texts corresponding to the plurality of sample user voices, include only the additionally trained some layers.

Also, the control method may further include the steps of inputting the operation result into a fourth neural network model stored in the at least one device and acquiring a text corresponding to the user voice, and performing an operation corresponding to the acquired text. Further, the fourth neural network model may be a model configured to fix weight values of some of the layers, and after the remaining layers of the third neural network model are additionally trained based on a plurality of sample user voices corresponding to the at least one device and a plurality of sample texts corresponding to the plurality of sample user voices, include only the additionally trained remaining layers.

According to the various embodiments of the disclosure as described above, an electronic apparatus can identify a device corresponding to a user voice, and make or cause the identified device perform an operation corresponding to the user voice.

Also, as the electronic apparatus uses a neural network model wherein only some layers for reinforcing voice recognition in a voice recognition neural network model were additionally trained, an operation result of the neural network model can be provided to a corresponding device, and as the device uses a neural network model wherein only the remaining layers for considering the device characteristic in a voice recognition neural network model were additionally trained, voice recognition optimized for the device can be performed.

It has been described above that a plurality of devices receive an operation result from an electronic apparatus, and perform operations corresponding to the received operation result, for the convenience of explanation. That is, so far, each of the plurality of devices has been described as processing an operation result by using the fourth neural network model, but the disclosure is not limited thereto. For example, each of the plurality of devices may store the first neural network model and the second neural network model, and receive a user voice and perform an operation together with the electronic apparatus, and transmit the operation result to the electronic apparatus or to at least one device.

Meanwhile, according to an embodiment of the disclosure, the various embodiments described above may be implemented as software including instructions stored in a machine-readable storage medium, which can be read by machines (e.g.: computers). The machines refer to apparatuses that call instructions stored in a storage medium, and can operate according to the called instructions, and the apparatuses may include the electronic apparatus according to the embodiments described herein (e.g.: an electronic apparatus A). In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to an embodiment of the disclosure, a method according to the various embodiments described above may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or may be distributed on-line through an application store (e.g.: Play Store™). In the case of on-line distribution, at least a portion of a computer program product may be stored in a storage medium such as the server of the manufacturer, the server of the application store, and the memory of the relay server at least temporarily, or may be generated temporarily.

In addition, according to an embodiment of the disclosure, the various embodiments described above may be implemented in a recording medium that can be read by a computer or an apparatus similar to a computer, by using software, hardware, or a combination thereof. In some cases, the embodiments described in this specification may be implemented as a processor itself. According to implementation by software, the embodiments such as processes and functions described in this specification may be implemented by separate software modules. Each of the software modules can perform one or more functions and operations described in this specification.

In embodiments, computer instructions for performing processing operations of machines according to the aforementioned various embodiments may be stored in a non-transitory computer-readable medium. Computer instructions stored in such a non-transitory computer-readable medium make the processing operations at machines according to the aforementioned various embodiments performed by a specific machine, when the instructions are executed by the processor of the specific machine. A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disc, a blue-ray disc, a USB, a memory card, a ROM and the like.

Also, each of the components (e.g.: a module or a program) according to the aforementioned various embodiments may consist of a singular object or a plurality of objects. Further, among the aforementioned corresponding sub components, some sub components may be omitted, or other sub components may be further included in the various embodiments. Generally or additionally, some components (e.g.: a module or a program) may be integrated as an object, and perform functions performed by each of the components before integration identically or in a similar manner. Operations performed by a module, a program, or other components according to the various embodiments may be executed sequentially, in parallel, repetitively, or heuristically. Or, at least some of the operations may be executed in a different order or omitted, or other operations may be added.

So far, embodiments of the disclosure have been shown and described, but the disclosure is not limited to the aforementioned specific embodiments, and it is apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic apparatus comprising:

a microphone;

a communication interface; and at least one processor; and a memory configured to store a first neural network model, a second neural network model, and instructions which, when executed by the at least one processor, cause the electronic apparatus to:

based on receiving a user voice during a plurality of predetermined intervals through the microphone, perform a device identification operation during each predetermined interval from among the plurality of predetermined intervals while the user voice is being received, wherein the device identification operation comprises:

acquiring an operation result by inputting the user voice into the first neural network model, identifying at least one device corresponding to the user voice by inputting the operation result into the second neural network model, and controlling the communication interface to transmit the operation result to the at least one device, wherein the first neural network model includes only some layers of a third neural network model, wherein the some layers are obtained by:

training the third neural network model comprising the some layers and remaining layers to identify a text from a voice, fixing weight values of the remaining layers, and additionally training the some layers based on a plurality of sample user voices corresponding to the electronic apparatus and a plurality of sample texts corresponding to the plurality of sample user voices, wherein, when the some layers are additionally trained, the remaining layers are not additionally trained, and wherein the second neural network model is trained to identify a device corresponding to the voice.

2. The electronic apparatus of claim 1, wherein the instructions are further configured to cause the electronic apparatus to:

acquire the operation result in a predetermined time unit by inputting the user voice into the first neural network model in the predetermined time unit, identify the at least one device in the predetermined time unit by inputting the operation result acquired in the predetermined time unit into the second neural network model, and control the communication interface to transmit the operation result acquired in the predetermined time unit to the identified at least one device in the predetermined time unit.

3. The electronic apparatus of claim 1, wherein the memory is further configured to store information about a plurality of devices and information about a plurality of projection layers, and wherein the instructions further cause the electronic apparatus to:

identify information about a second dimension that can be processed at the at least one device based on the information about the plurality of devices, based on the operation result having a first dimension different from the second dimension, change the operation result to have the second dimension based on projection layers corresponding to the first dimension and the second dimension among the plurality of projection layers, and control the communication interface to transmit the changed operation result having the second dimension to the at least one device.

4. The electronic apparatus of claim 1, wherein the memory is further configured to store information about a plurality of devices, and wherein the instructions further cause the electronic apparatus to:

based on identifying that a voice recognition function is not provided in the at least one device based on the information about the plurality of devices, acquire the text corresponding to the user voice by inputting the operation result into the remaining layers, and control the communication interface to transmit the acquired text to the at least one device.

5. The electronic apparatus of claim 1, wherein the instructions further cause the electronic apparatus to:

acquire scores for a plurality of devices by inputting the operation result into the second neural network model, and control the communication interface to transmit the operation result to devices having scores greater than or equal to a threshold value among the acquired scores.

6. The electronic apparatus of claim 1, wherein the memory is further configured to store information about a plurality of projection layers and the remaining layers of the third neural network model, and wherein the instructions further cause the electronic apparatus to:

based on receiving a first response from the at least one device after transmitting the operation result to the at least one device, control the communication interface to transmit a subsequent operation result to the at least one device, and based on receiving a second response from the at least one device after transmitting the operation result to the at least one device, process the operation result with one of the plurality of projection layers or input the operation result into the remaining layers.

7. The electronic apparatus of claim 6, wherein the instructions further cause the electronic apparatus to:

based on the second response including information about a second dimension that can be processed at the at least one device, change a first dimension of the operation result based on projection layers corresponding to the first dimension and the second dimension among the plurality of projection layers, and control the communication interface to transmit the changed operation result to the at least one device, and based on the second response including information that operation information cannot be processed, acquire the text corresponding to the user voice by inputting the operation result into the remaining layers, and control the communication interface to transmit the acquired text to the at least one device.

8. The electronic apparatus of claim 1, wherein the at least one device is configured to:

acquire the text corresponding to the user voice by inputting the operation result into a fourth neural network model stored in the at least one device, and perform an operation corresponding to the acquired text, and wherein the fourth neural network model is configured to fix weight values of the some layers, and after the remaining layers of the third neural network model are additionally trained based on the plurality of sample user voices corresponding to the at least one device and the plurality of sample texts corresponding to the plurality of sample user voices, include only the additionally trained remaining layers.

9. A control method of an electronic apparatus, the method comprising:

based on receiving a user voice during a plurality of predetermined intervals, performing a device identification operation during each predetermined interval from among the plurality of predetermined intervals while the user voice is being received, wherein the device identification operation comprises:

acquiring an operation result by inputting the user voice into a first neural network model;

identifying at least one device corresponding to the user voice by inputting the operation result into a second neural network model; and transmitting the operation result to the at least one device, wherein the first neural network model includes only some layers of a third neural network model, wherein the some layers are obtained by:

training the third neural network model comprising the some layers and remaining layers to identify a text from a voice, fixing weight values of the remaining layers, and additionally training the some layers based on a plurality of sample user voices corresponding to the electronic apparatus and a plurality of sample texts corresponding to the plurality of sample user voices, wherein, when the some layers are additionally trained, the remaining layers are not additionally trained, and wherein the second neural network model is trained to identify a device corresponding to the voice.

10. The control method of claim 9, wherein the acquiring comprises: acquiring the operation result in a predetermined time unit by inputting the user voice into the first neural network model in the predetermined time unit, wherein the identifying comprises identifying the at least one device in the predetermined time unit by inputting the operation result acquired in the predetermined time unit into the second neural network model, and wherein the transmitting comprises transmitting the operation result acquired in the predetermined time unit to the identified at least one device in the predetermined time unit.

11. The control method of claim 9, further comprising:

identifying information about a second dimension that can be processed at the at least one device based on information about a plurality of devices; and based on the operation result being having a first dimension different from the second dimension, changing the operation result to have the second dimension based on projection layers corresponding to the first dimension and the second dimension among a plurality of projection layers, wherein the transmitting comprises transmitting the changed operation result having the second dimension to the at least one device.

12. The control method of claim 9, further comprising:

based on identifying that a voice recognition function is not provided in the at least one device based on information about a plurality of devices, acquiring the text corresponding to the user voice by inputting the operation result into the remaining layers of the third neural network model, wherein the transmitting comprises transmitting the acquired text to the at least one device.

13. The control method of claim 9, wherein the identifying comprises acquiring scores for a plurality of devices by inputting the operation result into the second neural network model, and wherein the transmitting comprises transmitting the operation result to devices having scores greater than or equal to a threshold value among the acquired scores.

14. The control method of claim 9, further comprising:

based on receiving a first response from the at least one device after transmitting the operation result to the at least one device, transmitting a subsequent operation result to the at least one device; and based on receiving a second response from the at least one device after transmitting the operation result to the at least one device, processing the operation result with one of a plurality of projection layers or inputting the operation result into the remaining layers of the third neural network model.

15. The electronic apparatus of claim 1, wherein the instructions further cause the electronic apparatus to determine whether the at least one device has a capacity to process the operation result, and wherein based on the electronic apparatus determining that the at least one device does not have the capacity to process the operation result, the instructions further cause the electronic apparatus to obtain an additional operation result by inputting the operation result into the remaining layers of the third neural network model, and control the communication interface to transmit the additional operation result to the at least one device.

16. The electronic apparatus of claim 1, wherein each of the plurality of predetermined intervals is equal to approximately 25 milliseconds.

* * * * *